T. L. STURTEVANT.
SCREEN SEPARATOR.
APPLICATION FILED SEPT. 3, 1920.

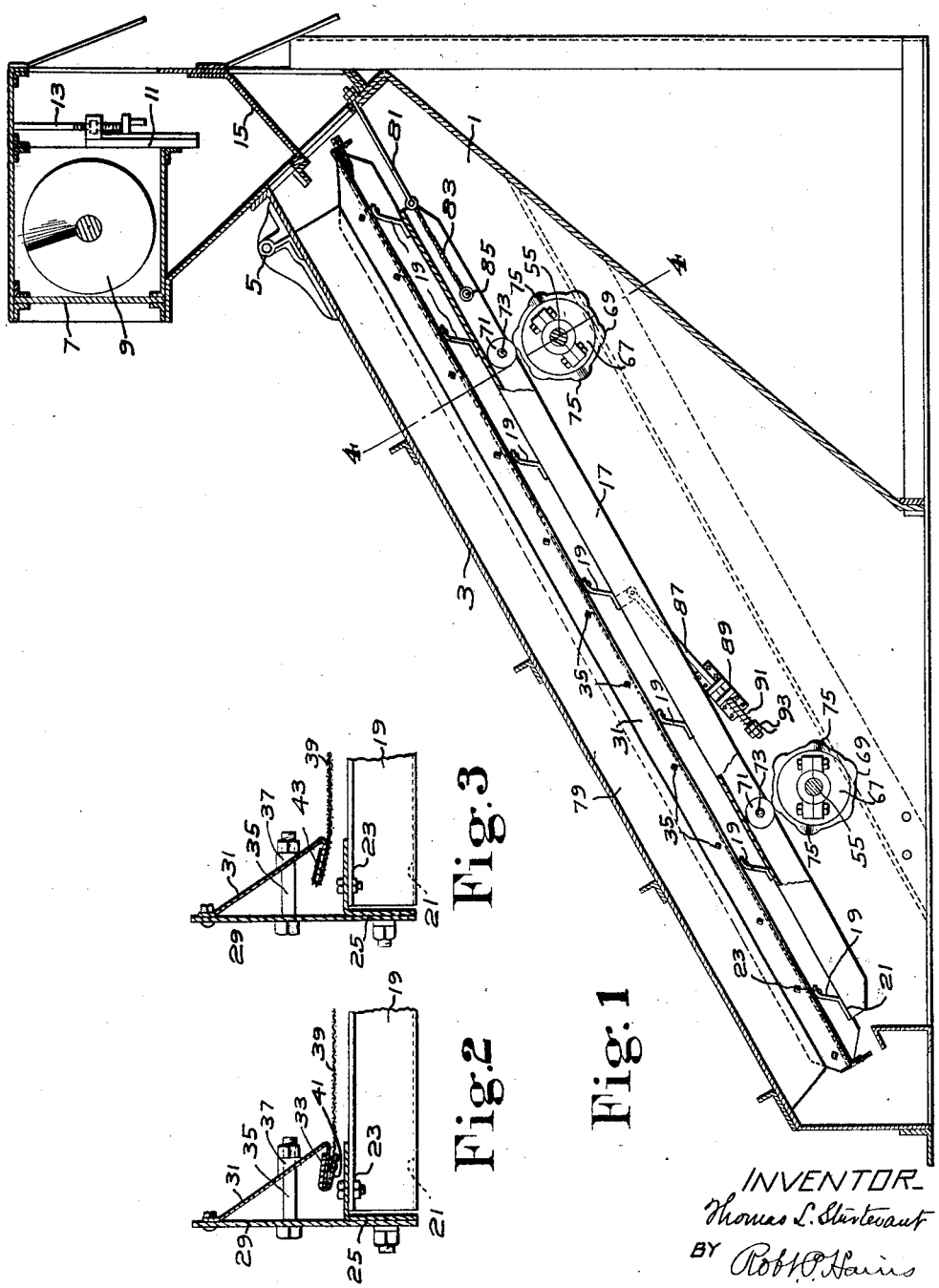

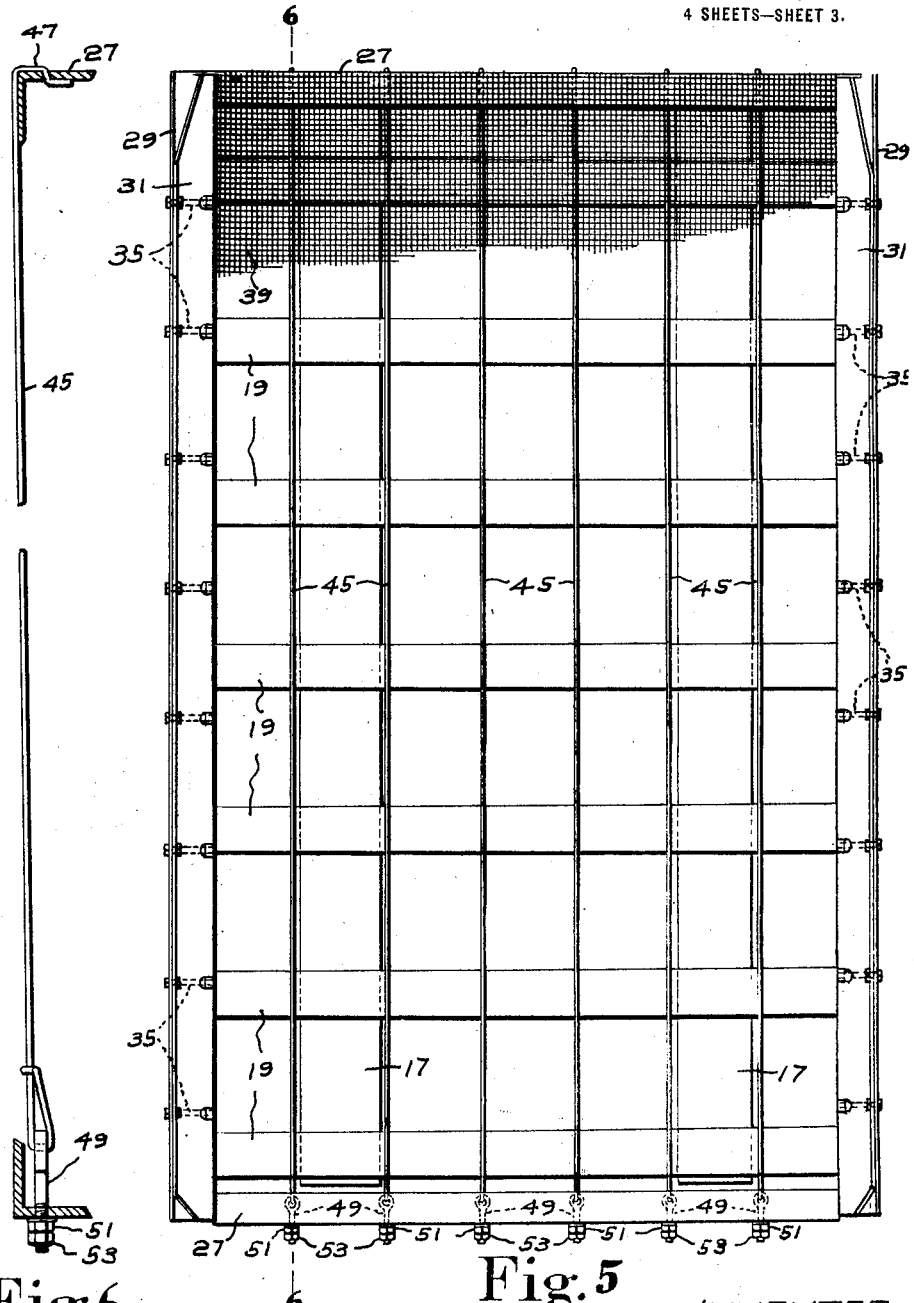

1,397,342.

Patented Nov. 15, 1921.
4 SHEETS—SHEET 4.

INVENTOR
Thomas L. Sturtevant
BY
Robt P. Haines.
ATTORNEY

UNITED STATES PATENT OFFICE.

THOMAS LEGGETT STURTEVANT, OF QUINCY, MASSACHUSETTS, ASSIGNOR TO STURTE-
VANT MILL COMPANY, OF BOSTON, MASSACHUSETTS, A CORPORATION OF MASSA-
CHUSETTS.

SCREEN-SEPARATOR.

1,397,342.   Specification of Letters Patent.   Patented Nov. 15, 1921.

Application filed September 3, 1920. Serial No. 408,003.

*To all whom it may concern:*

Be it known that I, THOMAS LEGGETT STURTEVANT, a citizen of the United States, and residing at Quincy, county of Norfolk, and State of Massachusetts, have invented an Improvement in Screen-Separators, of which the following description, in connection with the accompanying drawings, is a specification, like characters on the drawings representing like parts.

The invention to be hereinafter described relates to screen separators for grading materials.

These separators usually comprise a casing or frame provided with a feed box containing a screw conveyer for delivering materials to the upper edge of an inclined screen mounted in the casing or frame, suitable means being provided to vibrate the screen to keep the meshes of the clothing thereof in open condition for efficient grading effect.

The screen clothing experiences hard usage, so that it becomes necessary from time to time to substitute new clothing for old clothing. It is desirable that in changing from one to the other, the separator shall be out of commission as short a time as possible. One of the purposes of the present invention, therefore, is to provide simple and efficient means for securing the screen clothing to its frame and removing the screen clothing therefrom. The construction is such that the change may be made by the ordinary workman in a short space of time.

In some instances it may be desirable that the clothing shall be stretched, and in other instances it may be desirable that it shall be taut, but in unstretched condition. The latter is preferable to the former, since stretching of the clothing inevitably results in enlarging the meshes or other distortion of the clothing. Another purpose of the invention, therefore, is to provide means for securing the clothing to its supporting frame with provision for stretching the clothing or holding the same in unstretched condition, as desired.

With the aforesaid and other purposes in view, the character of the invention may be best understood by reference to the following description of one good form thereof shown in the accompanying drawings, wherein:—

Figure 1 is a vertical longitudinal section through a screen separator embodying the invention;

Fig. 2 is a detail of a portion of the separator showing one method of connecting the screen clothing to its supporting frame;

Fig. 3 is a detail of a portion of the separator, showing another method of connecting the screen clothing to its supporting frame;

Fig. 5 is a plan of the screen-supporting frame;

Fig. 6 is a section taken on the line 6—6 of Fig. 5; and

Figure 4:
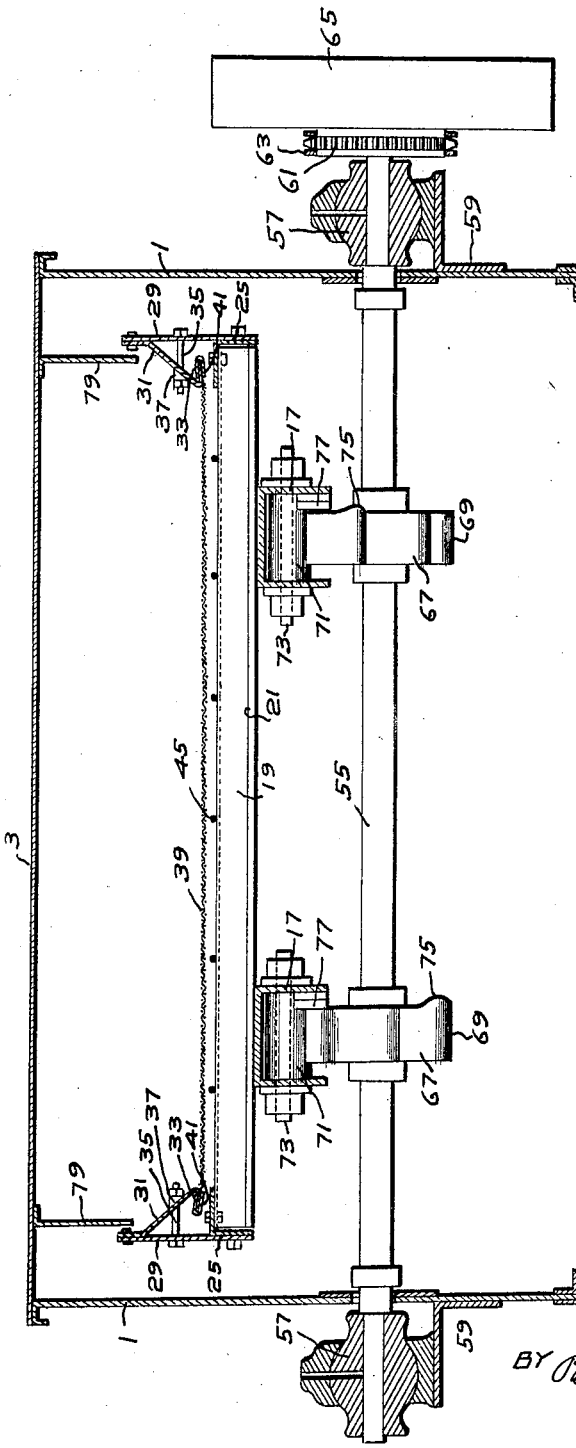
Fig. 4 is a transverse section taken on the line 4—4 of Fig. 1.

Referring to the drawings: The separator shown therein as one good form of the invention comprises a casing 1 having a cover 3 connected to the casing by hinges 5. At the top of the casing is a feed box containing a screw conveyer 9 adapted to feed the materials introduced at one end of the feed box along the feed box and over a feed board 11 carried by hangers 13. The materials flowing over the feed board strike a spill board 15 and are guided thereby to the upper edge of the screen to be described, mounted in the casing.

The support for the screen in the present instance of the invention comprises a pair of channels 17 spaced apart and having transverse members 19 mounted thereon. These transverse members have edge portions 21 which are connected to the backs of the channels and inclined portions projecting upward from the backs of the channels, and terminating in curved portions 23.

The channels and the transverse members may be of a resilient character such that they may be susceptible of longitudinal and transverse undulatory or vibratory movements contributing to shaking and vibration of the screen clothing, as more fully hereinafter described.

Mounted on the transverse members 19 are the side angle bars 25 having their horizontal flanges resting on and riveted to the curved portions 23 of the transverse members. End angle bars 27 have horizontal flanges resting on the side angle bars, and riveted thereto.

Side plates 29 may be superposed on the vertical flanges of the side angle bars and may be bolted or riveted thereto.

The means for securing the screen clothing to the frame described in the present instance of the invention comprises plates 31 disposed obliquely with respect to the side plates 29, and having the upper margins bolted to said side plates adjacent the upper ends thereof. The opposite or lower ends of the oblique plates 31 may be formed to provide outturned hooks 33. Bolts 35 may be entered through holes in the side plates 29, and the hook plates 31, chamfered spacing washers 37 being provided between the hook plates and nuts of the bolts.

The screen clothing 39 may be of woven wire, or other suitable material, and the size of the wires and the meshes of the clothing may vary according to the character of separation desired. If coarse, strong clothing is used, opposed margins thereof may be riveted or otherwise secured to the hooks 41, as shown in Figs. 2 and 4; or if the clothing is of sufficient strength, its opposed marginal portions may be bent over to present hooks 43 formed of the clothing, as shown in Fig. 3.

To connect the screen clothing with its supporting frame, the bolts 35 may be released so as to allow the clothing hooks to be attached to the hook plates. Then the bolts may be tightened to straighten the clothing without stretching the same, or they may be further tightened to stretch the clothing, if desired; but as stated, it is preferable to support the clothing on its frame in unstretched condition.

Suitable means may be provided to contribute to the support of the clothing intermediate the secured margins thereof. This means, in the present instance of the invention, comprises a series of wires or members 45, Figs. 4, 5 and 6, having ends 47 entered through and anchored to the upper end angle bar 27 referred-to. The opposite ends may be tied to eye-bolts 49 entered through the lower end angle bar 27 referred-to, and the eye-bolts may be provided with adjusting nuts 51 and lock nuts 53, whereby the wires may be given the tension desired. These wires are located beneath the screen clothing and above the transverse members 19, the construction being such that when the frame is vibrated by means to be described, the wires will slap or thresh against the clothing, and the transverse members, and keep the meshes of the clothing in open condition.

Suitable means may be provided for shaking or vibrating the frame, the wires, and the screen clothing. This means, in the present instance of the invention, comprises a pair of shafts 55 extending transversely across the casing and having end portions journaled in bearings 57 located externally of the casing, and mounted on angle bars 59, each secured preferably at two points to the side walls of the casing, the construction being such that these angle bars may undulate or vibrate more or less, and contribute to the vibratory movement of the shafts. Mounted on the shafts are sprocket wheels 61 connected by a sprocket chain 63, and one of the shafts has a pulley 65 thereon which may be driven from any suitable source of power.

Mounted on the shafts 55 are cams 67 having peripheral nubs or projections 69 thereon, adapted to engage and thump against followers conveniently in the form of rollers 71 on the shafts 73 carried by the channels 17 referred-to. When the cams are rotated, the nubs or projections 69 will engage the rollers 71 and impart up and down movements thereto and to the frame supported thereby.

In some instances it may be desirable, also, to impart lateral vibratory movements to the frame. To this end the cams may be provided with lateral projections 75 adapted to engage followers conveniently in the form of wedge-shaped blocks 77 secured to depending flanges of the channels. The construction is such that on rotation of the cams, the lateral projections 75 will engage the wedge-shaped followers and impart lateral shaking movements to the frame. Preferably the cams are so mounted on their shafts that the nubs or projections thereof will engage the followers out of step. As a consequence, irregular vibration or shaking movements of complex and varied character, will be imparted to the frame; and since the channels and transverse members have, as stated, a resilient character lively undulatory or vibratory movements will be set up therein. These movements, in turn, will be transmitted to the side plates 29, hook plates 31, and through the latter, to the screen clothing. These vibratory movements will also excite the wires 45 and cause them to slap or thresh against the transverse members and clothing, which will further contribute to efficient vibration of the clothing. These vibratory movements will also cause the clothing to thresh up and down against the wires, and the clothing will throw the materials up therefrom and on return to the clothing, the materials will thump against the same and further contribute to the vigorous slapping or threshing of the clothing against the wires. Thus, this varied and complex vibratory movements imparted to the frame, the wires, and the clothing, will insure that the latter will have its meshes always kept sufficiently open for efficient grading effect.

Suitable means may be provided to prevent the materials flowing down over the screen from escape over the side edges thereof. This means, in the present instance, comprises hanger plates or curtains 79 secured to and depending from the casing cover. These plates or curtains will cooperate with the side plates 29 and prevent escape of materials over the side edges of the clothing.

Preferably, the supporting frame and the screen are mounted in the casing in inclined position. Suitable means may be provided to prevent the frame from sliding down off from its supporting cams. This means, in the present instance, comprises hanger rods 81 having their upper ends connected to the upper end of the casing. The lower ends of these rods may be connected by chains 83 with bolts 85 secured to the flanges of the channels.

If the cams are rotated in a clockwise direction, Fig. 1, they may have a tendency to shift the screen-supporting frame upwardly. Suitable means may be provided yieldingly to oppose such movement. This means, in the present instance, comprises rods 87 connected to the supporting frame and extended through brackets 89 connected to the side walls of the casing. Coil springs 91 encircle these rods and are confined between the brackets and nuts 93 on the rods. The construction is such that these springs will react against the brackets and tend to pull the rods and the frame downward until limited by the hanger rods 81 referred-to.

In some instances the screen clothing is made of fine, bronze woven wire. Suitable means may be provided for connecting the margins of this wire with the supporting frame, and various means are shown herein for accomplishing this end.

Figure 7:
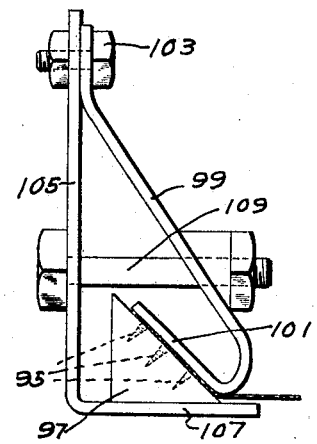
Figs. 7 to 12 are details, showing various methods of connecting the screen clothing with its supporting frame.

Referring to Fig. 7: The margins of the fine screen clothing are secured by tacks 95 to the inclined faces of wooden bars 97 which are triangular in transverse section. Oblique plates 99 may be provided having reversely bent ends 101. These oblique plates 99 may have their upper edges secured by bolts 103 to side plates 105 having horizontal flanges 107 which may serve as seats to support the wooden bars 97. Bolts 109 may be entered through holes in the side plates 105, and oblique plates 99. The construction is such that on release of these bolts the wooden side bars 97 at the margins of the clothing may be placed on the side plate flanges 107, and then the bolts 109 may be tightened to press the reversely-bent ends 101 against the clothing on the inclined faces of the side bars. Thus, the side bars 97 will be confined between the side plate flanges 107 and the oblique plate ends 101, but independent of positive attachment. This will enable the screen clothing to be quickly and easily connected to its supporting frame, or removed therefrom when it is desired to substitute new clothing therefor.

Figure 8:
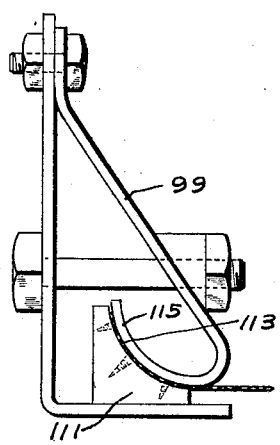

In Fig. 8 is shown a construction similar to that disclosed in Fig. 7, with the exception that side bars 111 are provided in place of the side bars 97, and have curved seats 113 to which the margins of the clothing are tacked, and the oblique plates 99 have reversely-bent ends 115 curved to conform to the curved seats 113.

Figure 9:
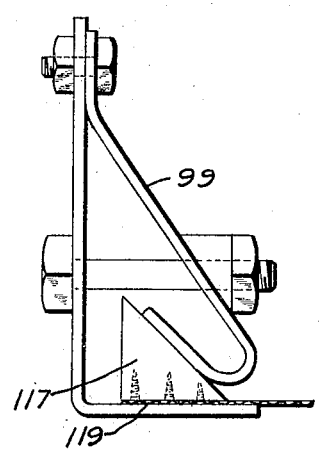

In the modification shown in Fig. 9, the side bars 117 are provided similar to the side bars 97, but the clothing is tacked to the bottom faces 119 of the side bars.

Figure 11:
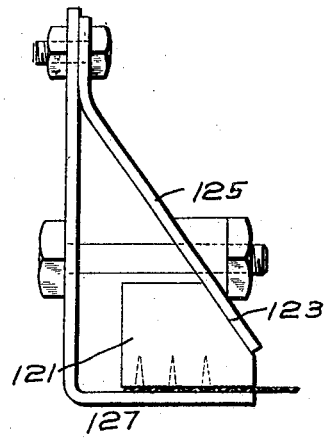

In the modification shown in Fig. 11, the side bars 121 are provided having beveled edges 123 engaged by oblique plates 125 which do not have reversely bent ends. The margins of the clothing are tacked to the bottom faces 127 of these side bars.

Figure 10:
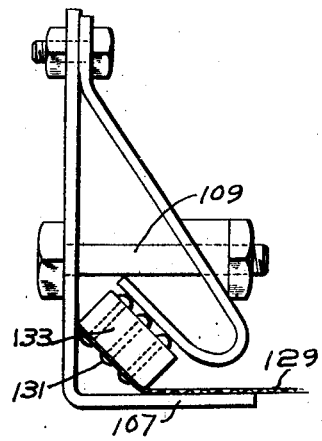

In the modification shown in Fig. 10, coarser screen clothing 129 is provided, and the margins thereof are connected by rivets 131 to rectangular bars 133 disposed obliquely with respect to the side plate flanges 107. Oblique side plates may be provided having reversely bent ends similar to the modification shown in Fig. 7, and the side bars 133 may be confined between the reversely bent ends of these oblique plates and the side plates.

Figure 12:
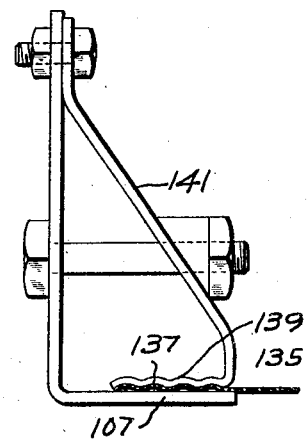

In the modification shown in Fig. 12, coarse woven wire screen clothing 135 is employed, having crimped margins 137 confined between the side plate flanges 107 and crimped flanges 139 of oblique plates 141. The construction is such that to secure the margins of the clothing to the frame they are placed on the flanges 107 and when the bolts are tightened, the crimped flanges 139 will press the crimped margins of the clothing against the side plate flanges 107 and secure the same independent of positive attachment.

In operation, the materials to be graded and introduced into one end of the feed box 7, fed by the screw conveyer along the feed box, and over the feed board 11. They pass therefrom downward onto the inclined spill board 15 and are directed thereby to the upper edge of the screen. The materials will flow downward along the screen and the finer materials will pass through the meshes of the clothing and be delivered through one outlet, while the coarser materials or tailings will flow down over the screen and be delivered through another outlet. As stated, the supporting frame and the screen will be vigorously vibrated to maintain the meshes of the clothing in open condition for efficient grading effect. When the clothing becomes worn, the workman may quickly and easily remove the same from its supporting frame, and substitute new screen clothing therefor, without the necessity for throwing the separator out of commission for any substantial length of time.

It will be understood that the invention is not limited to the embodiments shown, and that various deviations may be made therefrom without departing from the spirit and scope of the appended claims.

What is claimed is:—

1. In a separator for grading materials, the combination of a supporting frame having side plates, holding plates connected to said side plates, and adjustable relative to the side plates, screen clothing having side bars located between said side plates and holding plates and engaging the latter at points between said plates, and bolts for adjusting the holding plates toward the side plates in a direction in which the plane of the clothing extends to exert a stretching force upon the clothing and to hold the clothing properly positioned.

2. In a separator for grading materials, the combination of a support, side plates mounted on said support, holding plates connected to said side plates, and adjustable relative to the side plates and screen clothing having side members secured to the clothing for interlocking engagement with said holding plates in the space inclosed between the side plates and holding plates.

3. In a separator for grading materials, the combination of a support, screen clothing mounted on said support, and opposed securing devices on said support, each comprising a side plate, a plate inclined with respect to said side plate and movable relatively thereto, the screen clothing having side edges extending into the space between the side plates and inclined plates, and means for holding the edge of the screen clothing in the space between the inclined plates and side plates.

4. In a separator for grading materials, the combination of a supporting frame, securing devices carried by said frame, side plates having seats and swing members spaced from the seats and movable relatively thereto, means to adjust said swing members, screen clothing having bars at opposed margins thereof between the seats and swing members and engaged by said swing members to hold the clothing in position, and means to support and shake said frame and to impart the vibrations of the frame to the clothing.

5. In a separator for grading materials, the combination of a support, side plates mounted on said support, holding plates connected to said side plates, screen clothing having side bars for engagement with the outer faces of the holding plates, in the space between the side plates and the holding plates, and bolts for adjusting the holding plates relatively to the side plates to effect engagement between the holding plates and side bars to exert a pulling force upon the clothing to maintain it in taut condition.

6. In a separator, the combination of a support comprising side members and end members connected to said side members, side plates secured to and rising above the side members, holding plates associated with said side plates and projecting inwardly therefrom, screen clothing having side members for engagement with the holding plates in the space between the side plates and holding plates, and bolts to adjust the holding plates relatively to the side plates in a direction to draw the clothing taut and to hold it properly positioned.

7. In a separator, the combination of a frame comprising channels, transverse members mounted on and secured to said channels, side members connected to said transverse members, holding members associated with said side members, a screen having means upon its marginal parts engaged by said holding members, and means to adjust said holding members relatively to said side members properly to position the screen.

8. In a separator, the combination of a frame comprising channels, transverse members mounted on and secured to said channels, side members connected to said transverse members, holding members associated with said side members, a screen having means upon its marginal parts engaged by said holding members, means to adjust said holding members relatively to said side members to maintain the screen in operative position, and means operating through said frame for shaking the screen to maintain the meshes thereof in open condition.

9. In a separator, the combination of a frame comprising spaced longitudinal members having a plurality of transverse members secured thereto, side members connected to said transverse members, holding members associated with said side members, a screen having at its marginal parts engaged by said holding members, means to adjust said holding members relatively to said side members to maintain the screen in operative position, and cam means operating through said frame for shaking the screen to maintain the meshes thereof in open condition.

10. In a separator, the combination of a support, upstanding side plates thereon having inturned flanges forming seats, holding members associated with said side plates and projecting inwardly and downwardly from a portion of the side plates above said seats, screen clothing having side members resting on said seats and engaged by said holding members, and means to adjust said holding members relatively to the said side plates to enable mounting of the screen clothing on the support, and dis-mounting of the screen clothing therefrom.

11. In a separator, the combination of a support, upstanding side plates thereon having inturned flanges forming seats, holding plates associated with said side plates and having portions projecting inward from said plates above said seats, screen clothing, bars connected to opposed margins of the clothing and adapted for location on said seats in the space between the side plates and holding plates and for engagement with the holding plates, and means to adjust the holding plates relatively to the side plates to enable mounting of the screen clothing bars on and dis-mounting thereof from said seats.

12. In a separator, the combination of a support, side members mounted on said support, holding members associated with said side members, screen clothing having opposed marginal elements located in the space between said side members and holding members, means to adjust said holding members to move the same away from each other and toward said side members to secure the screen clothing elements therebetween, a series of vibratory members connected to said support and located beneath the screen clothing, and means to vibrate said support and cause the clothing and the members beneath it to slap against each other and keep the meshes of the clothing in open condition.

13. In a separator for grading materials, the combination of a supporting frame, upstanding side plates supported at the sides of said frame, holding plates adjustably supported by the side plates and projecting in an inclined direction inwardly and downwardly from a portion of the side plates, a screen having means at its marginal parts engaged by said holding plates in the space between the side plates and holding plates, means to adjust said holding plates to move the same away from each other to draw the screen taut and hold it in position, and means operating through said frame for shaking the screen to maintain the meshes thereof in open condition.

14. In a separator for grading materials, the combination of a support, screen clothing mounted on said support, opposed securing devices on said support, each comprising a side plate having an inwardly extending seat and a plate inclined with respect to the side plate and adjustably secured thereto in spaced relation to said seat, bars connected to the opposed margins of the screen clothing and adapted to be confined between said seat and a portion of the inclined plates, and means for adjusting the inclined plates to move them into holding engagement with said bars.

In testimony whereof, I have signed my name to this specification.

THOMAS LEGGETT STURTEVANT.